United States Patent [19]

van der Lely

[11] Patent Number: 4,609,153
[45] Date of Patent: Sep. 2, 1986

[54] DEVICE FOR SPREADING GRANULAR AND/OR POWDERY MATERIAL

[76] Inventor: Cornelis van der Lely, 7 Brüschenrain, Zug, Switzerland

[21] Appl. No.: 798,719

[22] PCT Filed: Sep. 6, 1982

[86] PCT No.: PCT/NL82/00028
§ 371 Date: May 6, 1983
§ 102(e) Date: May 6, 1983

[87] PCT Pub. No.: WO83/00793
PCT Pub. Date: Mar. 17, 1983

Related U.S. Application Data

[63] Continuation of Ser. No. 498,192, May 6, 1983, abandoned.

[30] Foreign Application Priority Data

Sep. 7, 1981 [NL] Netherlands .......................... 8104119
Sep. 7, 1981 [NL] Netherlands .......................... 8104120

[51] Int. Cl.⁴ ...................... A01C 17/00; A01C 19/00
[52] U.S. Cl. .................................... 239/665; 239/670; 239/682; 239/684; 239/687; 222/482
[58] Field of Search ............... 239/665, 670, 681, 682, 239/684, 687; 222/482, 486

[56] References Cited
U.S. PATENT DOCUMENTS 2,489,171 11/1949 Balduf ................................ 239/687

FOREIGN PATENT DOCUMENTS

| 101977 | 9/1937 | Australia | 239/684 |
| 809091 | 3/1969 | Canada | 239/687 |
| 1945076 | 4/1978 | Fed. Rep. of Germany | 239/687 |
| 391691 | 9/1908 | France | 239/682 |
| 1252165 | 12/1960 | France | 239/684 |
| 106012 | 9/1963 | Netherlands | 239/687 |
| 355053 | 8/1931 | United Kingdom | 239/682 |
| 776951 | 6/1957 | United Kingdom | 239/682 |
| 785829 | 11/1957 | United Kingdom | 239/687 |
| 1089569 | 11/1967 | United Kingdom | 239/687 |
| 1126005 | 9/1968 | United Kingdom | 239/687 |
| 1493525 | 4/1976 | United Kingdom | |
| 2034163 | 6/1980 | United Kingdom | 239/682 |

Primary Examiner—Andres Kashnikow
Assistant Examiner—Mary Beth O. Jones
Attorney, Agent, or Firm—Penrose L. Albright

[57] ABSTRACT

Distribution members of a spreading device are disposed closely adjacent to each other. The distance between the points of closest approach of the distribution members being about two centimeters with the outside diameter of each distribution member being about thirty-five centimeters. Flow of material to each distribution member of the spreading device is controlled by a delivery member which comprises dosing plates that are independently displaceable relatively to each other and to the bottom of the device's hopper. The dosing plates and the hopper's bottom have openings which cooperate with one another in an adjustable manner which makes it possible to adjust independently the position of the delivery of material to the distribution member both in radial and circumferential directions, and to adjust the size of the openings.

28 Claims, 14 Drawing Figures

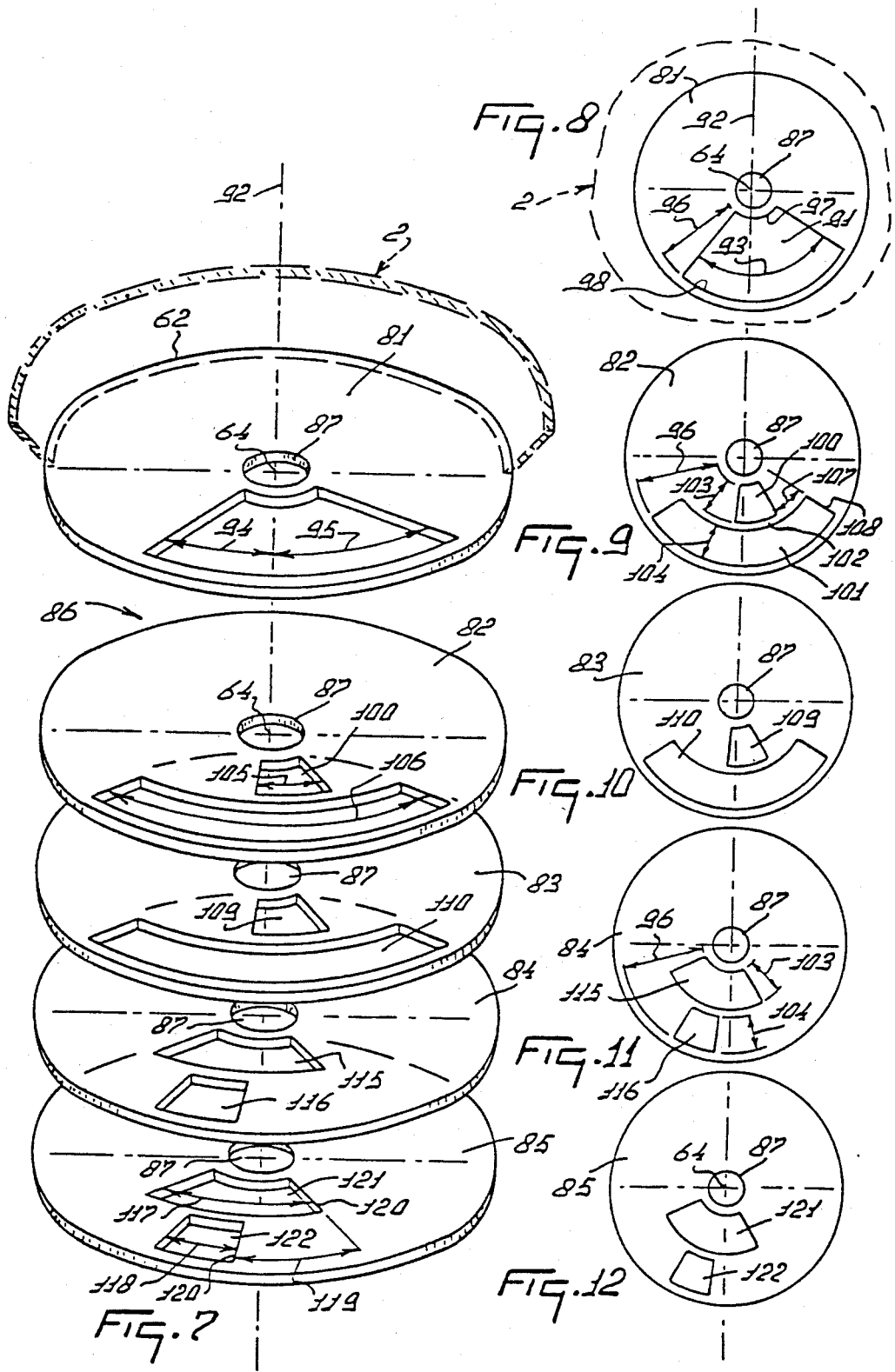

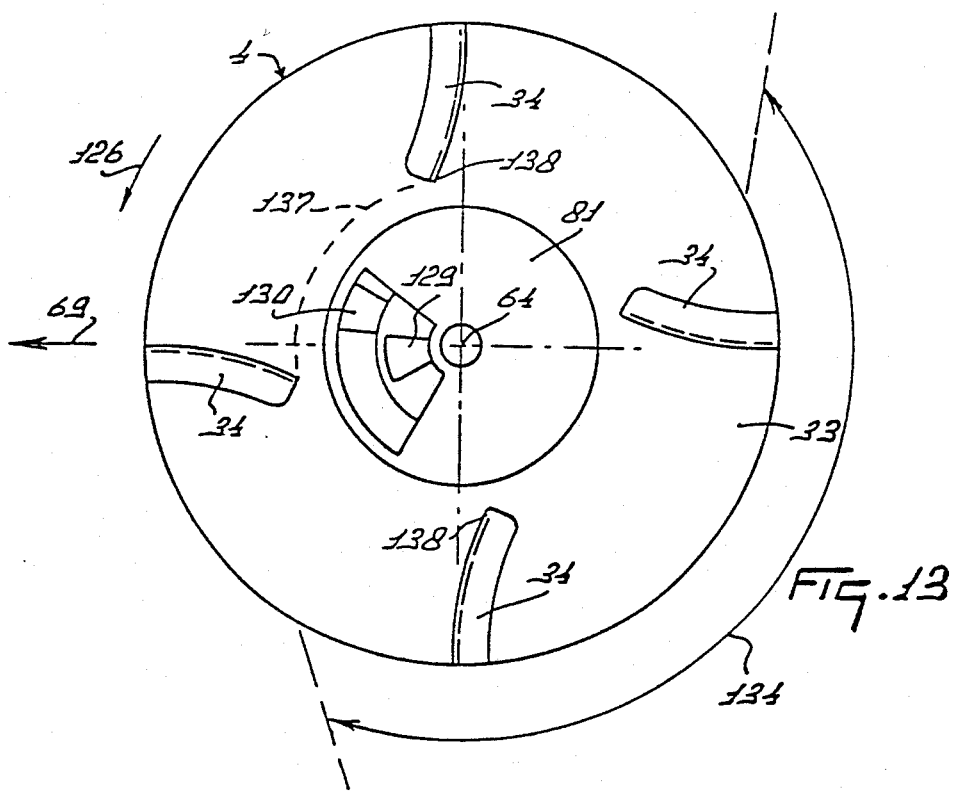
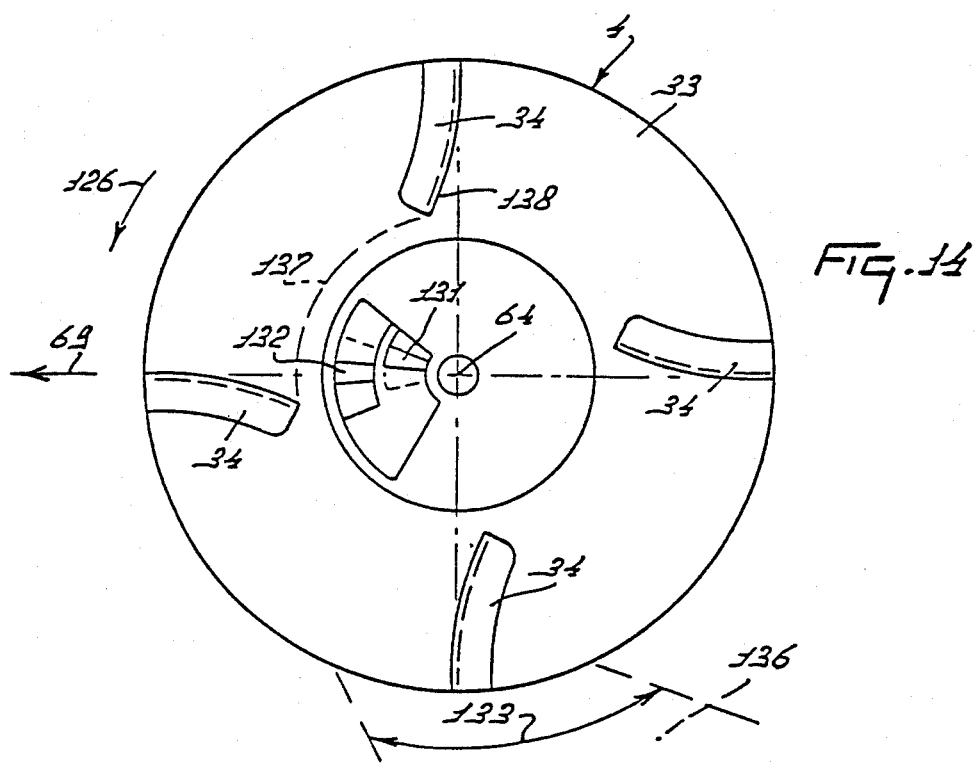

DEVICE FOR SPREADING GRANULAR AND/OR POWDERY MATERIAL

RELATED APPLICATION

This is a continuation application of application Ser. No. 498,192 filed May 6, 1983, now abandoned.

SUMMARY OF THE INVENTION

This invention relates to a device for spreading granular and/or powdery material, such as fertilizer, seeds or similar material, comprising a frame, a hopper and at least two distribution members adapted to move about rotary axes.

According to the invention the two distribution members are arranged at a short distance from one another and coupled with a driving mechanism designed so that the distribution members can be driven as desired with any one of two or more different speeds. In this way a device is obtained by which the width over which the material is spread in one run can be controlled in a simple manner, while a uniform distribution pattern is obtained. An advantageous disposition of the distribution members is obtained when the parts of the distribution members nearest one another are spaced apart by a distance of about two centimeters.

An advantageous construction of the device embodying the invention is obtained when during the operation of the device of parts farthest remote from the rotary axes of the distribution members are moving on a circle having a diameter of about thirty-five centimeters.

A further aspect of the invention is concerned with a device of the kind set forth in the preamble in which the distribution members are coupled with a driving mechanism which is formed so that the distribution members can be rotated with a speed of at least 1040 rev/min. As a result the material can be very uniformly spread over a large width. According to a further aspect it is advantageous for the driving mechanism of the distribution members to comprise a plurality of gear wheels arranged in a gear box and being in mesh with one another between the distribution members, which are thereby coupled with one another. In this way it can be ensured that the two distribution members are driven with the same speed of rotation.

A further aspect of the invention relates to a device of the kind set forth in which in accordance with the invention the gear wheels arranged between the two distribution members are spur gear wheels rotatable about upwardly extending rotary axes and arranged in a gear box forming a flat, hollow beam between frame parts. This can have an advantageous effect on a low construction of the device.

According to a further aspect of the invention in a device of the kind set forth the hopper is made from a single piece of material. In this way the hopper can be readily made, while its lifetime will be satisfactory. The quantity of material to be carried for a run can be effectively increased by mounting an extension piece on the hopper.

According to a further aspect of the invention the hopper has two delivery spouts, each of which adjoins a distribution member, whereby at least one delivery spout is provided with delivery means adapted to move with respect to the hopper in a manner such that the place where the material is fed to the distribution member is displaceable about the rotary axis of the distribution member or in a radial direction relative to the rotary axis of the distribution member or both, the circumferential angle through which the material leaves the circumference of the distribution member being adjustable. In this way a spreading device is obtained by which the material can be spread in many ways so that during its travel the device can spread the material as desired for example, either on a narrow strip or on a very wide strip.

For a better understanding of the present invention and to show how it may be carried into effect, reference will now be made, by way of example, to the accompanying drawings, in which:

BRIEF DESCRIPTION OF THE DRAWINGS

FIG. 7 is an exploded view, in the direction of the arrow VII in FIG. 6, of a dosing mechanism;

FIG. 8 is a plan view of the hopper bottom;

FIG. 9 is a plan view of a first dosing disc;

FIG. 10 is a plan view of a second dosing disc;

FIG. 11 is a plan view of a third dosing disc;

FIG. 12 is a plan view of a fourth dosing disc;

FIG. 13 is a plan view of the dosing mechanism and a distribution member and;

FIG. 14 is a plan view corresponding to FIG. 13 but which shows the parts in a different operative condition.

DESCRIPTION OF THE PREFERRED EMBODIMENT

Figure 1:
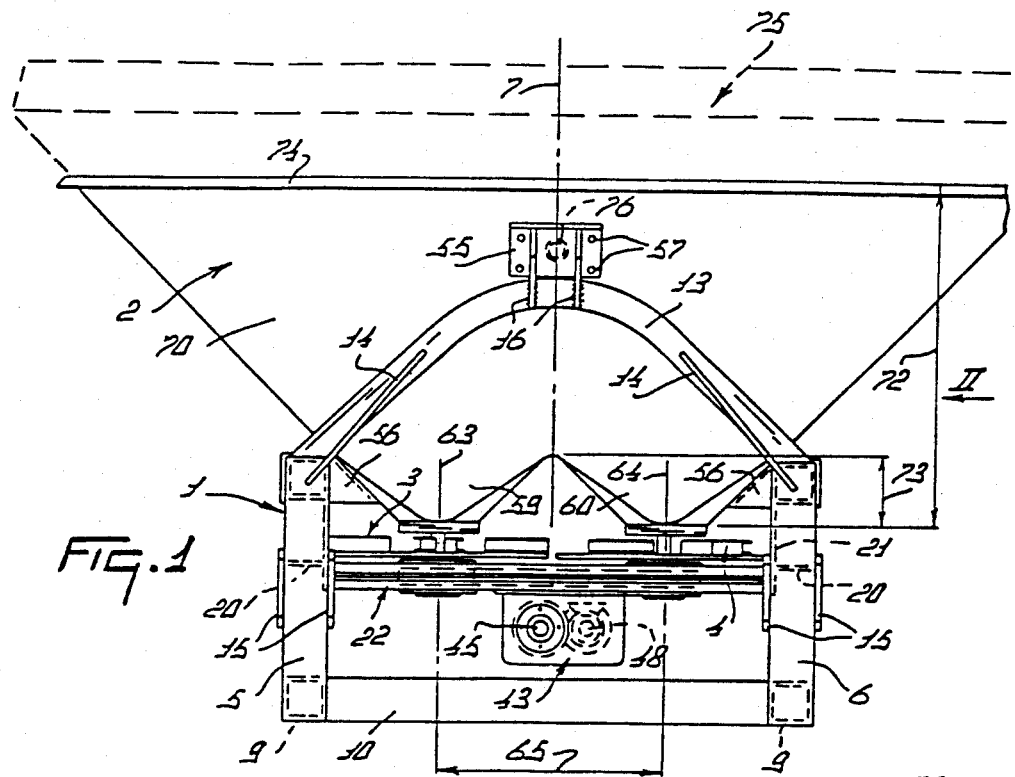
FIG. 1 is a front view of a spreading device embodying the invention.

The spreading device illustrated in the Figures comprises a frame 1, on which a hopper 2 is arranged and which is provided with two distribution members 3 and 4, which are located beneath the hopper. The frame 1 has a symmetrical shape with respect to the vertical plane 7 going through the longitudinal center line of the device and extending in the intended direction 69 of operative travel of the device. The frame comprises two side beams 5 and 6 bent in the form of a U and extending parallel to a longitudinal plane 7. Each of the side beams 5 and 6 has a straight upper limb 8 and a straight lower limb 9, these limbs being horizontal in the horizontal position of the device. The limbs 9 of the frame beams 5 and 6 are interconnected by a square-section, hollow transverse beam 10 and a channel-shaped rear beam 11 fastened to the ends of the limbs 9. The limbs of the rear beam 11 have aligned holes 12, the centers of which are located in the longitudinal plane 7. The limbs 8 are interconnected by a v-shaped tie beam 13 fastened to the upper surfaces of the limbs 8 and being furthermore fastened to the beams 5 and 6 by struts 14. The tie beam 13 slopes upwardly and forwardly away from the limbs 8 at an angle of about 45°. At their curved leading portions the beams 5 and 6 are each provided with two coupling strips 15, and the curved top part of the beam 13 is provided with coupling strips 16.

Each of the side beams 5 and 6 is provided with an angle-section carrying beam 20, which is parallel to the limbs 8 and 9. The carrying beams 20 extend away from the curved parts of the side beams 5 and 6 in the same direction as the limbs 8 and 9 and from the curved parts they extend to the rear with respect to the usually forward direction 69. The connection of the carrying beams 20 with the side beams is reinforced by vertical stiffening plates 21 located between the respective limbs 8 and the beam 20. The carrying beams 20 are intercoupled by a horizontal gear box 22. The gear box 22 comprises a lower panel 23 to the ends of which are welded fastening plates 24 which are connected with the carrying beams 20 by means of bolts 25. The gear box 22 comprises an upper panel 26, which is coupled with the lower panel by means of bolts 27. The bolts 27 extend across protruding rims 28 and 29 of the lower and upper panels and the lower and upper panels are symmetrical with respect to the horizontal plane where the lower and upper panels join one another as is shown in the Figures.

In the gear box 22 are journalled parallel shafts 31 and 32 extending upwards in a vertical direction. On these shafts are arranged the distribution members 3 and 4 as is shown in detail in FIG. 6 for the shaft 32. Each of the distribution members 3 and 4 comprises a plate 33 fastened at right angles to the shaft concerned and provided with ejection blades 34. The plates 33 of the two distribution members are located with their ejection blades at the same level and are rotatable in the same plane. The ejection blades 34 of the two distribution members are angularly offset from one another with the result that they pass alternately the point of closest approach of the two distribution members.

Figure 5:
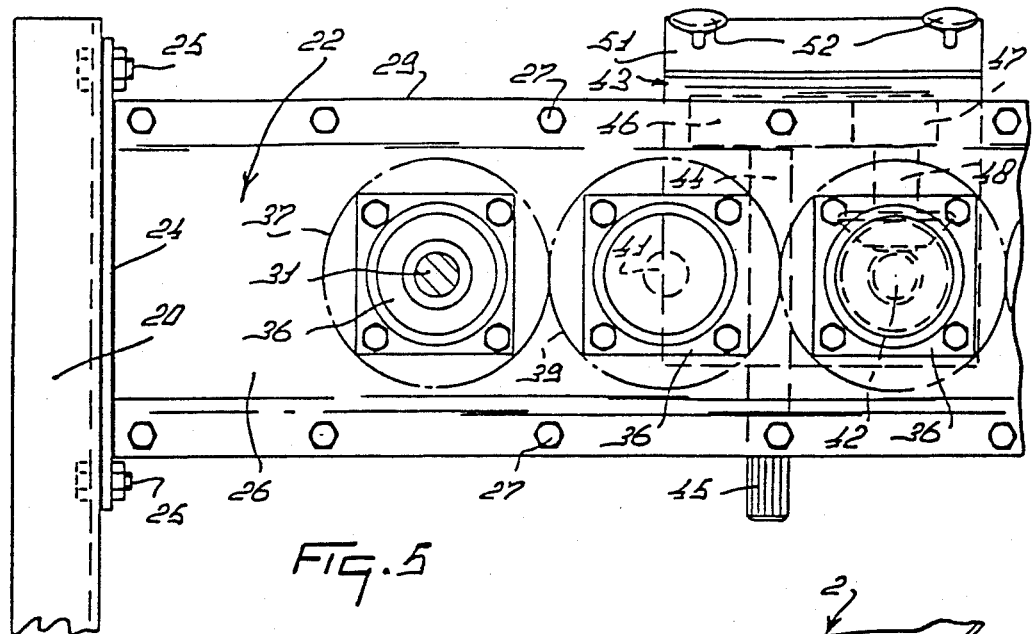
FIG. 5 is an enlarged view of part of FIG. 4, the distribution members being omitted.
Figure 6:
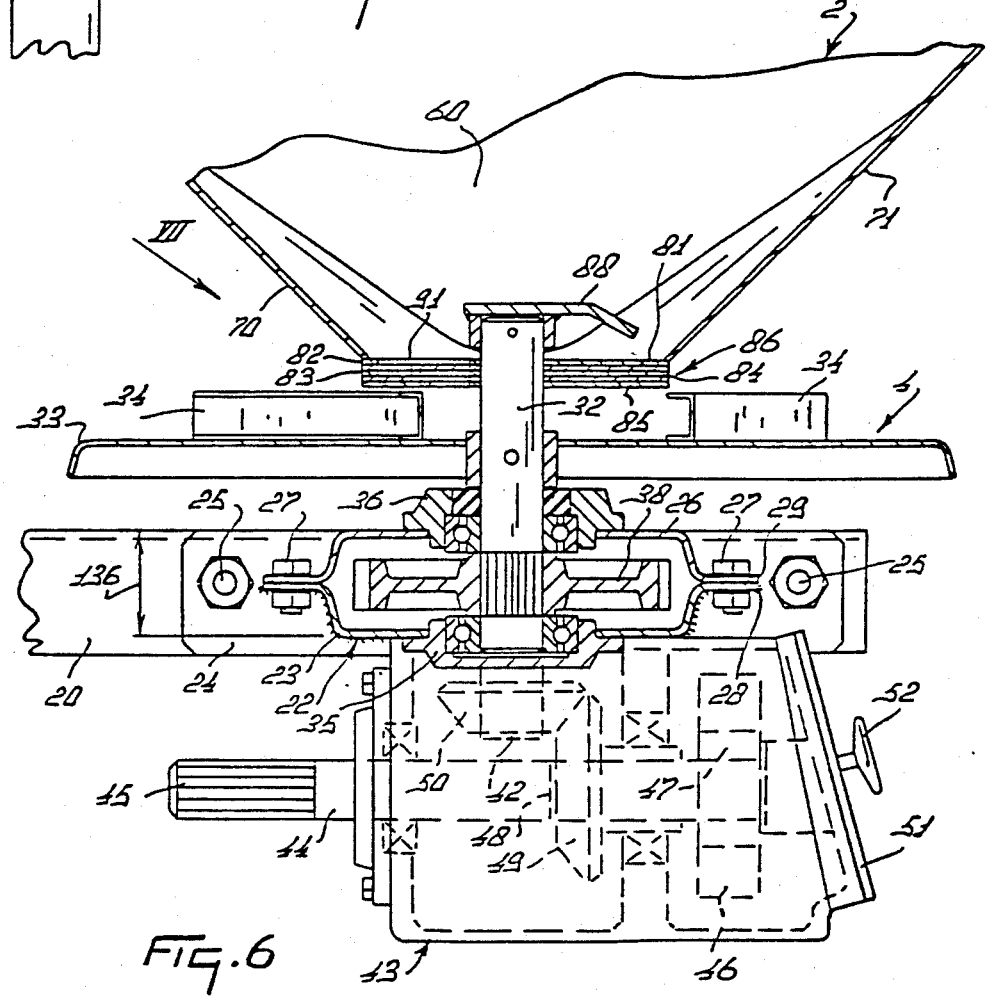
FIG. 6 is an enlarged sectional view taken on the line VI—VI in FIG. 4.

As is shown in FIG. 6 for the shaft 32, the shafts 31 and 32 are journalled in a bearing housing 35 arranged in the lower panel 23 and a bearing housing 36 arranged in the upper panel 26. The shafts 31 and 32 are provided with spur gear wheels 37 and 38, located in the gear box. Between the gear wheels 37 and 38 are arranged two gear wheels 39 and 40. The gear wheels 37 to 40 are in horizontal positions and in mesh with one another as will be apparent from FIGS. 4 and 5. The gear wheels 39 and 40 are arranged on vertical shafts 41 and 42, which are journalled in the gear box in bearing housings corresponding with the bearing housings 35 and 36 of FIG. 6. The shaft 42 extends downwards across the bearing housing in the lower panel and its lower end is located in a gear box 43 forming a driving box. The gear box 43 is arranged in a manner not shown in detail at the lower side of the gear box 22 and is provided with a driving shaft 44, which extends in a horizontal direction in the horizontal position of the device and has an end 45 emerging from the front side of the gear box 43 which constitutes a coupling part. The shaft 44 is provided with a spur gear wheel 46, which co-operates with a spur gear wheel 47. The gear wheel 47 is arranged on a shaft 48 which is journalled in the gear box 43 and is parallel to the shaft 44. The shaft 48 is provided with a bevel gear wheel 49 which is in mesh with a bevel gear wheel 50 on the shaft 42. The gear wheels 46 and 47 are releasably arranged on the shafts 44 and 48 respectively and constitute with one another and, as the case may be, with other sets of gear wheels, exchangeable and interchangeable sets of gear wheels. The gear box 43 is provided with a readily removable cover 51 for exchanging and interchanging the gear wheels 46 and 47. The cover 51 is provided to this end with knobs 52.

Figure 2:
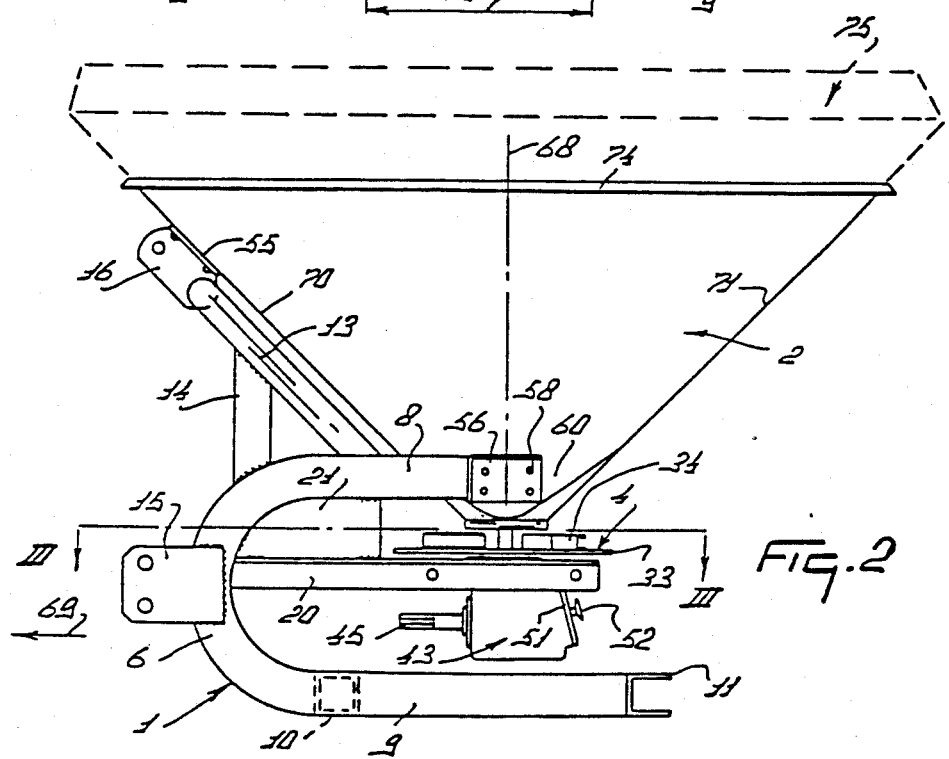
FIG. 2 is a side elevation of the device taken in the direction of the arrow II in FIG. 1.
Figure 3:
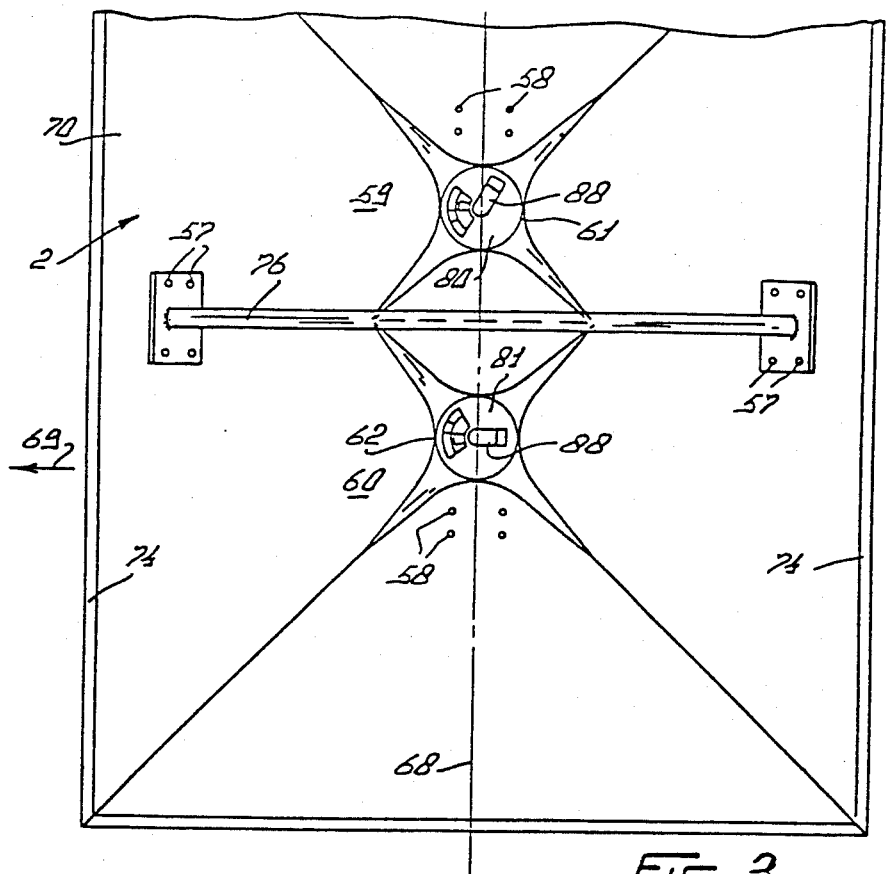
FIG. 3 is a plan view of the device shown in FIGS. 1 and 2.

At the coupling strips 16 the frame 1 is provided with a fastening plate 55 and the ends of the limbs 8 of the side beams 5, 6 are provided with supports 56. The hopper 2 is mounted in the frame 1 on the fastening plate 55 and the supports 56 by means of bolts 57 and 58 respectively. The hopper 2 constitutes a single unit, which may be obtained by pressing a metal plate, while the two delivery spouts 59 and 60 are formed on the hopper 2. The hopper 2 has four flat sides and has a rectangular shape, viewed on plan. The delivery spouts 59 and 60 change from top to bottom into round bottom openings 61 and 62. The delivery spouts 59 and 60 are located above the distribution members 3 and 4 and the center lines 63 and 64 of the shafts 31 and 32 coincide with the center lines of the openings 61 and 62. The center lines 63 and 64, which constitute rotary axes of the distribution members 3 and 4, are spaced apart by a distance 65, which is only slightly greater than the diameter 66 of the distribution members 3 and 4 as will be apparent from FIGS. 1 and 4. The proximal sides of the distribution members 3 and 4 are spaced apart by a very short distance 67, for example, two centimeters. The two distribution members 3 and 4 are arranged side by side so that the center lines 63 and 64 are located in a vertical plane 68 extending transversely of the direction 69, when the machine is in a horizontal position. The hopper 2 is symmetrical to the plane 7 as well as to the plane 68. The front and rear walls 70 and 71 respectively of the hopper are at an angle of 45° to the horizontal. The front wall 70 extends along the beam 13 (FIG. 2). Near the top, the walls 70 and 71 are interconnected by a stiffening bar 76, which is horizontal in a horizontal position of the device and extends in the direction 69. The center line of the stiffening bar 76 is located in the plane 7. The integral hopper has a height 72, which is four to five times the height 73 of the individual delivery spouts 59 and 60. The middle of each support 56 is located in the plane 68 and the limb 8 of each side beam 5 and 6 terminates in front of the plane 68, whereas the limb 9 of each of these beams is located at a distance behind the plane 68 such that, as viewed on plan, the beam 11 is farther away from the plane 68 than is the circumference of each distribution member 3 and 4, as will be particularly apparent from FIGS. 2 and 4.

At the top, the hopper 2 has a bent-over rim 74, on which an extending piece 75 can be arranged to enlarge the hopper capacity. The extending piece 75 is indicated in FIGS. 1 and 2 by broken lines.

The bottom openings 61 and 62 of the delivery spouts 59 and 60 are provided with bottom plates 80 and 81, which are rigidly secured to the undersides of the delivery spouts 59 and 60 respectively. Between the delivery spouts and the respective distribution members are arranged dosing mechanisms 86, each of which comprises four dosing plates 82, 83, 84, and 85, as is shown in detail for the dosing mechanism 86 between the bottom 81 and the distribution member 4. The bottom plate 81 and each of the dosing plates 82 and 85 have a central opening 87, through which extends the shafts 32 of the distribution member 4 down to the underside of the delivery spout 60. The centers of the openings 87 coincide with the rotary axis 64. In the delivery spout 60 the shaft 32 is provided with a member 88 for agitating material therein. The dosing plates 82 to 85 are adapted to be turned about the shaft 32 with respect to one another and to the bottom 81. To this end each of the dosing plates 82 to 85 is connected with a setting mechanism by which they can be displaced and be maintained in a desired position relative to one another and to the bottom 81. The connection of the dosing plates with the setting mechanism and the setting mechanism are not shown, various operable constructive and arrangements of same being within the skill of the art. Similarly dosing plates 82 to 85 are arranged in the device as would occur to one skilled in the art so that they can be readily turned with respect to one another, while the dosing plate 82 can be readily turned with respect to the bottom 81.

Viewed with respect to the direction 69, in front of the shaft 32, the bottom plate 81 has a delivery orifice 91 extending on both sides of a vertical plane 92 extending in the direction 69 and containing the rotary axis 64. The delivery orifice 91 subtends an angle 93 of about 98° at the rotary axis 64. The orifice 91 covers an angle 95 of about 60° on the side of the vertical plane 92 remote from delivery spout 59 with the distribution member 3. On the side of the plane 92 where the delivery spout 59 is located, the orifice 91 covers a further angle 94 of about 38°. In a radial direction of the orifice 91 covers a distance 96, which is substantially equal to the whole radial distance of the bottom plate 81, there being provided, however, near the hole 87 a small rim 97 and near the outer circumference a small rim 98. The dosing plate 82 has passages 100 and 101 extending in a radial direction with respect to the rotary axis 64 over a distance equal to the distance 96 and, viewed in a radial direction, they are located below the delivery orifice 91. The passages 100 and 101 are separated from one another by a small arcuate strip 102 and each of them covers equal distances 103 and 104, measured in a radial direction. The passage 100 covers an angle 105 of about 35° around the axis 64, whereas the passage 101 covers an angle 106 of about 115° around the rotary axis 64. The passage 100 is nearer the rotary axis 64 than the passage 101 and is located inside the angle 106 of the passage 101. The passage 100 is spaced apart by an angle 107 of about 30° from the end 108 of the passage 101. Said end 108 being remote from the side of the dosing plate directed to the interior of the device, or respectively, the other delivery spout 59.

The dosing plate 83 has passages 109 and 110, the size and location of which relative to one another and to the rotary axis correspond with those of the passages 100 and 101 of the dosing plate 82. The dosing plates 82 and 83 are identical. The dosing plate 84 has two passages 115 and 116 spaced apart in a radial direction to the rotary axis 64 by a distance such that the passage 115 is nearer the rotary axis 64 than the passage 116. The passages 115 and 116 extend in a radial direction, like the passages in the bottom 81 and the dosing plates 82 and 83, over a distance 96. In a radial sense the passages 115 and 116 cover equal distance 103 and 104 so that their distance from the rotary axis 64 correspond with the distance between the passages 100, 101 and 109, 110 and the axis 64. The passage 115 covers an angle 117 of about 90° around the rotary axis 64, whereas the passage 116 covers an angle 118 of about 25° around the axis 64. The passage 116 is located completely inside the angle 117 and the passage 116 is off-set through an angle 119 of about 30° with respect to the radial side 120 of the angle 115 remote from the medium side of the device or, respectively, the other delivery spout 59. The dosing plate 85 is identical to the dosing plate 84 and has two passages 121 and 122, the size of which is equal to that of the passages 115 and 116, while their positions relative to one another and to the rotary axis 64 are the same as those of the passages 115 and 116.

Like the bottom plate 81 the bottom plate 80 has a delivery orifice 91. However, the delivery orifice in the bottom plate 80 is located so that with the orifice 91 it is symmetrical to the vertical, longitudinal plane 7. Below the bottom plate 80 is arranged a dosing mechanism similar to the dosing mechanism 86 and also having four dosing plates similar to dosing plates 82 to 85. The passages in the dosing plates beneath the bottom plate 80, as stated for the delivery orifices in the bottom plates 80 and 81, are symmetrical to the vertical plane 7.

When the device is put into use, it is hitched via the coupling strips 15 and 16 to the three-point lifting device of a tractor. The coupling end 45 of the driving shaft 44 is coupled with the power take-off shaft of the tractor or a similar vehicle. The device serves to spread distributable material, particularly fertilizer, seeds or similar substances on a field. The material can be carried in the hopper 2. The amount of material carried for a single run may be raised by mounting the extension rims 75 on the upper rim 74 of the hopper 2 so that, for example, twice the initial amount of material can be carried by the device.

The material can be fed from the hopper 2 to the distribution members 3 and 4 through the delivery orifices 91 in the bottoms 80 and 81 and through the passages of the various dosing plates 82 to 85. For spreading the material the distribution members 3 and 4 are rotated in the direction of the arrows 125 and 126 from the power take-off shaft of the tractor via the driving shaft 44 and the gear wheels in the gear box 43 and the gear box 22. The distribution members rotate in opposite senses and the proximal sides of the distribution members move in the direction 69.

The direction in which the material is ejected by each of the distribution members having a given diameter 60 depends on the speed of rotation of the distribution member and the place where the material is fed from the hopper to the distribution member with respect to the rotary axis of the distribution member and the direction of movement 69. The speed of rotation of the distribution members 3 and 4 may be varied, as desired to any one of several values by interchanging the gear wheels 46 and 47 or by exchanging these gear wheels for a different set of gear wheels. Within the limits imposed by the orifice 91, the place on each of the distribution members which receives the material can be changed by turning one or more of the dosing plates 82 to 85 with respect to one another and/or with respect to the bottom 80 or 81 respectively. The passages 100 and 109 co-operating with one another constitute a port located below the orifice 91 of the bottom 81 and relatively near the rotary axis 64. The passages 116 and 122 of the dosing plates 84 and 85 forms a port relatively remote from the rotary axis 64 below the orifice 91 and below the elongate passages 101 and 110. The passages 100 and 109 co-operate below the orifice 91 and above the passages 115 and 121 to form a port or delivery opening of a given size to deliver material out of the hopper. The place of the passages 100 and 109 within the circumferential angle 93 of the orifice 91 and the circumferential angle 117 of the passages 115 and 121 is adjustable about the rotary axis 64. The registering passages 116 and 122 constitute a port or outlet opening of a given size below the orifice 91 and below the passages 101 and 110, said size being variable within the circumferential angle 93 of the orifice 91 and the circumferential angles 106 of the passages 101 and 110 about the rotary axis 64. The sectors in which are located the various orifices in the bottom and the various dosing plates are chosen so that the port formed by the passages 100 and 109 and the port formed by the passages 116 and 122 can be shifted, within given limits, relatively to one another and/or in common about the rotary axis 64 and also be fixed in their desired positions. Therefore, the place receiving the material on the distribution member concerned can be widely varied. It is particularly important that, measured in a radial direction, the material should be fed over a comparatively large distance 96 to the distribution member and that the place where the material can be fed through the passages 100 and 109, near the axis 64, to the distribution member should be displaceable with respect to the place where the material is fed thorugh the passages 116 and 122, farther from the rotary axis 64, to the distribution member.

Thanks to the resultant adjustability of the passages about the rotary axis 64 with respect to the direction 69, the circumferential angles in which the material leaves the circumference of the distribution member can be varied within wide limits. It is important that the material flowing through the port formed by the passages 100 and 109 should reach the distribution member farther away from the circumference thereof an hence should cover a longer path on the distribution member than the material fed to the distribution member through the port formed by the passages 116 and 122. The ports formed by the passges 100 and 109 and the passages 116 and 122 can be disposed relatively to one another so that the flows from these ports reach the distribution member more or less separately and move along adjacent or contiguous paths of the distribution member towards the circumference thereof so that the material can leave the circumference of the distribution member over a large circumferential angle. However, the dosing plates 82 to 85 can also be adjusted so that the material fed through the passages 100 and 109 to the distribution member moves towards the circumference thereof along a path which coincides with the path along which the material fed through the passages 116 and 122 moves to the circumference of said distribution member. When the two paths overlap one another, the material will leave the circumference of the distribution member over a relatively small circumferential angle.

A satisfactory feed of material to the distribution members is obtained when, viewed in a direction parallel to the rotary axes, the passages are located inside an imaginary circle 137 on which are located the inner ends 138 of the ejection blades 34. The speed of rotation of the distribution members and the place where the material is fed to the distribution members can be set so that the material can be spread at will in one of a large number of directions in sectors of selected width by each of the distribution members.

The location of the orifices 91 and the bottoms 80 and 81, the sense of rotation and the variable speed of rotation of the distribution members as well as the diameters thereof are chosen so that the distribution members can spread the material in coinciding sectors or in sectors coinciding partly or not coinciding at all.

The device is particularly suitable for spreading material in a manner such that the distribution members cover coinciding sectors. To this end the distribution members rotate in the opposite senses 125 and 126 while the delivery orifices 91 and the passages in the various dosing plates are located symmetrically on both sides of the plane 7 so that the distribution members spread the material in symmetry with respect to the vertical plane 7. In order to cover the widest possible strip of land during the movement of the device in the direction 69 the speed of rotation of the distribution members will be relatively high and the place of reception of the material on the distribution members will be set so that the material leaves the circumference of the distribution members in a large circumferential angle whereby it is spread over a wide sector.

Figure 4:
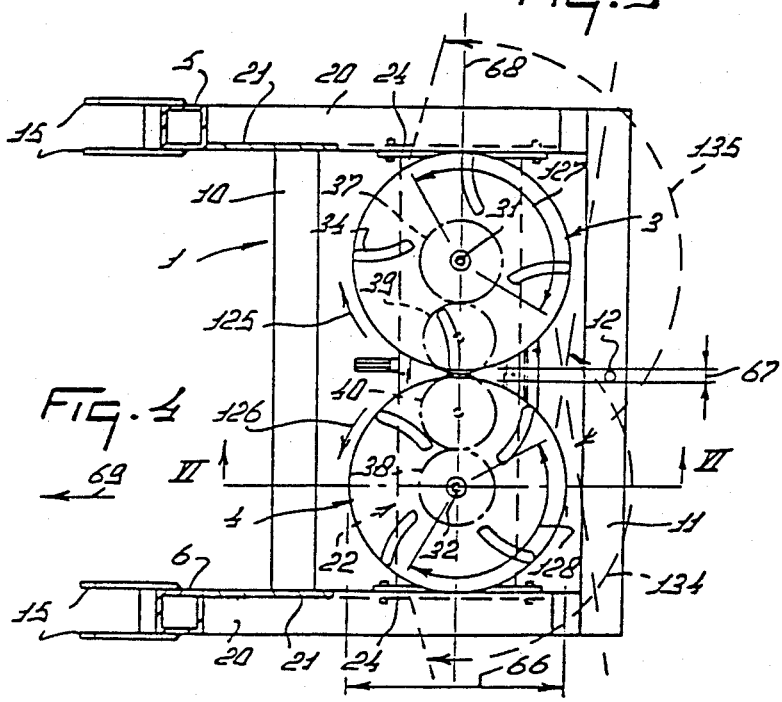
FIG. 4 is a plan view of the device of FIGS. 1 to 3, the hopper being omitted.

FIG. 13 shows a position of the dosing plates 82 to 85 in which the material leaves the circumference of the distribution member in a circumferential angle 128 (FIGS. 4 and 13) of about 150°. To this end the passages 100 and 109 are set so that they form a port 129 which, with respect to the direction of rotation 126, leads with respect to a further port 130 formed by the passages 116 and 122. The ports 129 and 130 constitute the outlets of the delivery means of the hopper formed by the bottom 80 and the dosing plates 82 to 85. Since the bottom 80 with the dosing plates 82 to 85 are in a horizontal position like the distribution member 4, the location of the ports 129 and 130 will correspond to the place where the material reaches the distribution member. Owing to said position of the ports 129 and 130 the material will arrive at the distribution member in a manner such that the material passing through the two ports will flow along adjacent paths of the distribution member towards the circumference thereof so that it reaches and passes beyond the circumference through the large circumferential angle 128. Above the distribution member 3 ports corresponding with the ports 129, 130 below the bottom 80 with the dosing plates 82 to 85 are set symmetrically to the plane 70 so that the distribution member 3 spreads the material through a circumferential angle 127 of about 150°. The sectors 134 and 135 thus covered by the distribution members 3 and 4 are symmetrical relative to the vertical plane 7, while at the same time they overlap one another completely (FIG. 4). The locations of the circumferential angles 127 and 128 can be varied about the rotary axis 63 and 64 respectively by turning in common the dosing plates 82 and 85 about the respective rotary axes, while their relative positions are maintained. The ports 129 and 130 of course, must be maintained within the angle 93 of the delivery orifice 91. This setting is important for the distribution of different kinds of material.

FIG. 14 shows a position of the dosing plates 82 to 85 in which a port 131 is formed by the passages 100 and 109 and a further port 132 formed by the passages 116 and 122. The ports 131 and 132 are in such relative positions that with respect to the direction of rotation 126 the port 132 leads with respect to the port 131. This disposition of the ports 131 and 132 results in that material passing through the port 131 reaches the distribution member and flows along a path towards the circumference of the distribution member which coincides with the path along which the material emanating from the port 132 moves towards the circumference of the distribution member. The sizes of the ports 131 and 132 are smaller than those of the ports 129 and 130 since the dosing plates 82 and 83 and the dosing plates 84 and 85 are relatively arranged so that the passages 100 and 109 and the passages 116 and 122 coincide only partly, owing to the selected setting of the dosing plates 84 and 85 relative to one another.

In the embodiment shown in FIG. 14 the material leaves the circumference of the distribution member over an angle of about 45° so that the distribution member 4 spreads the material over a relatively narrow sector 136. In the case of a symmetrical disposition relative to the plane 7 of the dosing plates below the bottom 80 the distribution member 3 spreads material on a sector lying symmetrically with respect to the vertical plane 7 with the sector covered by the distribution member 4. In the disposition shown in FIG. 14 the distribution members 3 and 4 will spread the material on non-overlapping sectors so that during the run of the device the material is deposited on adjacent strips of land.

Within the extreme limits of the size of covered sectors indicated in FIGS. 13 and 14 many different sizes and positions of the sectors may be selected by setting the dosing plates 82 to 85 relatively to one another and relatively to the bottom 80 or 81 concerned. The dosing plates can be set by means of the setting mechanisms (not shown in detail) with which the dosing plates are coupled. Therefore, the device is capable of spreading the material on very narrow strips as well as in very wide strips, while a satisfactory distribution pattern may be invariably obtained.

Moreover, with such adjustability of the dosing plates a selected small or large quantity of material can be spread per unit of surface, and the width of the surface to be covered in a single run can be widely varied at will. The material may be spread on wide strips during one run and on spaced apart strips on another. Spreading on strips spaced apart from one another is important for treating row cultures.

As stated above the two distribution members can spread the material symmetrically about the plane 7, with the dosing plates 82 to 85 below the bottoms 80 and 81 set symmetrical to said plane 7. It is, however, also possible to cause one distribution member to spread the material along a selected strip which differs from the that spread from other distribution member. For example, one distribution member may spread the material in a direction which is different from that of the other distribution member. Moreover, the dosing plates of the two dosing mechanisms may be set so that the distribution members spread the material in sectors of different widths.

Although in the embodiment shown two distribution members are provided, it is also possible to use the construction of the dosing mechanism 36 with four dosing plates 82 to 85 as described above in a spreading device having only one distribution member adapted to move about a rotary axis.

From the above-described embodiment of the inventive idea it should be apparent to those skilled in the art that a construction according to the invention provides a large variety of spreading options. Owing to the various modes of operation of a device embodying the invention, it can be economically employed on large as well as small farms.

The relatively independently adjustable four dosing plates provide a large number of selectable settings. Inasmuch as each dosing plate has two passages spaced apart by different distances from the rotary axis, a satisfactory distribution of the material on the distribution member is obtained, while the possibilities of adjustment are enhanced. In principle, it is possible to join the two passages to form a single opening. For example, the strip 102 between the passages 100 and 101 may be omitted.

If it is desired to spread a large amount of material per unit area, it is an advantage that a large quantity of material can be carried in each run. This is possible by mounting the extension 75 at the top of the hopper 2. When comparatively small quantities of material per surface unit have to be spread and in particular, when the material is to be spread in separate strips, the hopper 2 has, in general, sufficient capacity to carry material for one or more runs. The construction is particularly advantageous with a hopper 2 having a capacity of four hundred liters and an extension piece 75 also having a capacity of four hundred liters. Thus, when the extension piece is used, eight hundred liters of material can be carried.

The size and shape of the hopper 2, as disclosed, are such that it can be readily pressed from a single piece of metal or otherwise fabricated from a single piece of material. Making the hopper integrally from a piece of material is simplified by using a small height 73 for the delivery spouts 59 and 60 as compared with the overall height 72. Thus the capacity of the hopper is maintained as large as possible. It is considered advantageous to arrange the distribution members as closely as possible to one another and to use distribution members of moderate diameter so that the delivery spouts need not be spaced apart by a great distance. This structure of the hopper ensures, in addition, a satisfactory flow of material from the hopper through the delivery spouts.

In this embodiment the diameter 66 of the distribution members is about thrity-five centimeters and the distance 65 between the rotary axes 63 and 64 of the distribution members is about thrity-seven centimeters. The delivery spouts 59 and 60 can thus be near one another, while by the same token the overall width of the hopper need not be excessively great. Moreover, owing to the comparatively small diameter and the disposition of the distribution members near one another the width of the frame may be small. Therefore the quantity of material required for constructing the device is minimized, which is conducive to the manufacture of the frame and the hopper.

The structure of the frame and the hopper shown ensures that its manufacture is advantageous and relatively inexpensive. The height of the gear box 22 with the horizontal gear wheels 37 to 40 may be small, which is advantageous to provide a low construction. The box 22 constitutes a satisfactory stiffening part between the beams 20 and a satisfactory support for the distribution members. Mounting and fixation of the gear box 22 can be readily obtained, since the lower panel 23 is rigidly connected with the beams 20 by means of the bolts 25, while the cover or upper panel 26 can be arranged on the beams 20 independently of the securing of lower panel 23.

The diameter of the distribution members may very advantageously be kept small, whereas nevertheless the material can be spread over a large width, when the distribution members can be rotated at a comparatively high speed. Preferably the speed of rotation exceeds about 1040 rev/min so that the spreading width may amount to, for example, twenty-four meters. An advantageous speed of rotation of the distribution members may, for example, be 1500 rev/min. Driving the distribution members by means of gear wheels, the distribution members being intercoupled by the four gear wheels 37 to 40, ensures a reliable operation, while the relative positions of the distribution members is maintained.

The adjustment of the speed of rotation of the distribution members can be simply carried out by removing the cover 51 and replacing the gear wheels 46 and 47 by a different set of gear wheels or by interchanging them. The cover 51 can, to this end, be readily disengaged from the gear box 43. The adjustment of the speed of rotation ensures a satisfactorily controllable spreading width and a uniform distribution.

The beams 11 and 10 of the frame 1, together with the beam 13 and the gear box 22 constitute a satisfactory connection between the two curved side beams 5 and 6. Holes 12 in the beam 11 can be used to attach a further implement to the device, for example, a trailer carrying material to be spread.

Although various features of the spreader described and illustrated in the drawings, will be set forth in the following claims as inventive features, the invention is not necessarily limited to these features and may encompasses all inventive features that have been disclosed both individually and in various combinations.

Having disclosed my invention, what I claim as new and to be secured by Letters Patent of the United States is:

1. A device for spreading granular and/or powdery material such as fertilizer, seeds or similar material for use in agricultural operations, comprising: a frame; a hopper and at least two side-by-side substantially horizontal distribution members adapted to move about substantially vertical rotary axes, the proximal sides of the two distribution members spaced apart by a distance less than ten percent of the outward circumference of each and being on either side of first vertical plane containing the longitudinal center line of the device which extends in the intended direction of the device's operative travel; a driving mechanism comprising an input shaft parallel to said longitudinal center line and extending forwardly centrally where it is adapted to be coupled to the power take-off shaft of a tractor on which the device is mounted; an intermediate shaft mechanically interconnected with said input shaft by two readily interchangeable gears for changing the ratio of input speed to output speed, the axes of rotation of said input shaft and said intermediate shaft defining a first substantially horizontal plane which is substantially perpendicular to said first vertical plane, said input and intermediate shafts and said interchangeable gears being in a first gear box; a transfer shaft mechanically interconnected with said intermediate shaft having an axis of rotation substantially normal to said first substantially horizontal plane; and means to drive said distribution members in opposite rotational directions from said transfer shaft comprising an even number of intermeshing spur gears in a second relatively flat elongated gear box, the axes of rotation of said spur gears defining a second substantially vertical plane which is perpendicular to said first substantially horizontal plane and also to said first vertical plane, said first gear box being in close juxaposition with a central portion of said second gear box and said transfer shaft extending from said first to said second gear box so that the driving mechanism comprising the power train from said input shaft to said distribution members presents a low profile as defined by said gear boxes.

2. A device as claimed in claim 1, wherein said proximal sides of distribution members are spaced apart by a distance of about two centimeters and the diameter of each said outward circumference is about thirty-five centimeters.

3. A device as claimed in claim 1, wherein said distribution members are adapted to move about relatively parallel rotary axes which are located in same second vertical plane.

4. A device as claimed in claim 1, wherein said distribution members rotate at a speed of at least 1040 revolutions per minute.

5. A device as claimed in claim 1, wherein said driving mechanism comprises said intermeshing spur gears which are arranged in said second gear box and are drivably in mesh with one another, said spur gears being arranged between shafts for rotating said distribution members and coupling the same with each other.

6. A device as claimed in claim 5, wherein said second gear box comprises a flat, hollow beam extending between frame parts of the device and a lower panel provided at the ends with coupling plates by which said gear box is fastened to said frame parts, said second gear box being further provided with an upper panel which is releasably arranged on said lower panel.

7. A device as claimed in claim 6, wherein said frame parts form supporting beams coupled at their forward ends with curved parts of side frame beams vertically bent in the form of a U, each said supporting beam being located between the limbs of the respective said U-shaped side beams.

8. A device as claimed in claim 7, wherein the lower limbs of said U-shaped side beams are coupled with one another by two transverse beams, one of which interconnects the ends of said lower limbs of said U-shaped side beams and is located, as viewed on plan, at least substantially near the rear side of said distribution members.

9. A device as claimed in claim 7, wherein as viewed from side elevation, said first gear box is arranged below said second gear box.

10. A device as claimed in claim 7, wherein said U-shaped side beams of the frame are coupled with one another by a curved tie beam disposed at a higher level than the uppermost aspects of said U-shaped side beams and which is connected with the upper surfaces of said U-shaped side beams, said hopper being fastened to said tie beam and further to fastening supports provided at the ends of upper limbs of said U-shaped side beams.

11. A device as claimed in claim 1, wherein said hopper is formed from a single piece of material.

12. A device as claimed in claim 1, wherein said hopper has two delivery spouts each of which adjoins a said distribution member, at least one said delivery spout being provided with delivery means movable with respect to said hopper so that the place where the material is fed to its corresponding said distribution member is displaceable about the rotary axis of such distribution member and in a radial direction with respect to said rotary axis, the circumferential angle through which the material leaves the circumference of the distribution member being adjustable.

13. A device as claimed in claim 12, wherein said feeding place comprises a first place near said rotary axis and a second place farther from said rotary axis, both said places being relatively adjustable about said rotary axis.

14. A device as claimed in claim 13, wherein said first place and said second place are respectively defined by two spaced outlet ports, one of which is radially spaced outboard of the other.

15. A device as claimed in claim 14, wherein said ports are formed by at least one delivery orifice in the bottom of said hopper and by a passage in one or more dosing plates adjustable with respect to said bottom.

16. A device as claimed in claim 15, wherein said delivery orifice in said bottom is located forward of said rotary axis viewed with respect to the intended direction of operative travel of the device and extends to both sides of a plane containing said rotary axis and extending in said travel direction.

17. A device as claimed in claim 16, wherein said bottom is adjoined by two said dosing plates each of which has two passages spaced apart radially from one another, said passages in one dosing plate having a different disposition from the passages in the other said dosing plate, said passages being closable to a greater or less extent independently of one another.

18. A device as claimed in claim 17 wherein the innermost of said two passages on one of said dosing plates has a greater width in degrees of arc than the outermost passage thereon and the outermost of said two passages on the other of said dosing plates has a greater width than the innermost passage thereon.

19. A device as claimed in claim 12, wherein said delivery means is formed symmetrically about the vertical plane which contains the longitudinal center line of the device.

20. A device as claimed in claim 19, wherein each said distribution member is provided with at least one ejection blade, the blades of the two said distribution members being relatively angularly off-set so that the ejection blades of the two said distribution members are rotated alternately by the point where the distribution members are nearest one another.

21. A device as claimed in claim 19, wherein dosing plates are provided for one distribution member which are adjustable independently of dosing plates provided for other distribution member.

22. A device as claimed in claim 1, wherein an extension piece is releasably arranged on the top of said hopper.

23. A device as claimed in claim 1, wherein said frame is provided with fastening members by which the device can be hitched to the three-point lifting device of a tractor or a similar vehicle.

24. A low profile driving mechanism for driving two side-by-side distribution members of agricultural spreaders for fertilizer and the like at more than one selected rotational speed in opposite directions, said distribution members being disposed under a hopper which has means for delivering materials such as fertilizer or the like separately to each said distribution member, the mechanism comprising an input shaft adapted to be connected to the power take-off shaft of a tractor, an intermediate shaft, readily interchangeable gears connecting said input shaft to said intermediate shaft, a transfer shaft mechanically interconnected to said intermediate shaft, an even number of intermeshing spur gears, the outermost of said spur gears having upstanding shafts which rotate respective said distribution members, an innermost said spur gear being rotated by said transfer shaft, said input shaft extending under at least one innermost said spur gear and extending forwardly relative thereto while said interchangeable gears are located rearwardly relative thereto, said input shaft and said intermediate shaft being substantially horizontal, said transfer shaft and said upstanding shafts being substantially vertical.

25. A mechanism as claimed in claim 24 comprising a horizontal, transverse elongated relatively flat gear box in which said spur gears are mounted and a frame for supporting said hopper having two horizontal beams extending respectively on the outboard sides of said distribution members, said gear box mounted between and connected to said horizontal beams.

26. A mechanism as claimed in claim 25 comprising a further gear box for said input shaft, said intermediate shaft and said interchangeable gears which is centrally supported from said first-mentioned gear box, said input shaft extending out of the forward side of said further gear box and a closure which can be readily opend and closed being disposed on the rear of said further gear box and immediately to the rear of said interchangeable gears to facilitate rapid manual interchange of said interchangeable gears.

27. A mechanism as claimed in claim 25 wherein said frame comprises a pair of outboard U-shaped side beams having horizontal limbs, a respective said side beam being mounted on each side of each said distribution members, a respective said horizontal beam being disposed between said corresponding horizontal limbs of each said side beam and being rigidly connected thereto by a stiffening plate which connects said horizontal beam to at least one of said horizontal limbs of the corresponding said side beam, the free ends of said horizontal limbs extending to the rear and coupling means for coupling said frame to the lifting device of a tractor being rigidly secured to the foremost part of each said side beam.

28. A device for spreading granular or powdery material such as fertilizer and seed which comprises:
 a hopper for said material;
 a rotatable distribution member disposed under said hopper, said distribution member revolving about a substantially vertical axis;
 a dosing mechanism at the bottom of said hopper comprising said bottom and at least two superimposed dosing plates which each define two radially-spaced passages, said plates being selectively movable relative to said axis, said dosing mechanism including said radially-spaced passages, defining two delivery openings, the first of said delivery openings being adjacent said axis and inboard the second of said delivery openings which is spaced outboard the first, said delivery openings being independently adjustable within limits of said radially-spaced passages' angular relationship to each other relative to said axis and said hopper so that the directions and widths of sectors of material ejected by said distribution member can be adjusted, an outboard of said passages extending a greater width in degrees of arc than an inboard said passage on one of said dosing plates and an inboard of said passages extending a greater width in degrees of arc than an outboard said passage on the other of said dosing plates.

* * * * *